Feb. 24, 1931. R. THURM ET AL 1,794,214
MACHINE FOR DISSOLVING XANTHATES
Filed Jan. 20, 1930
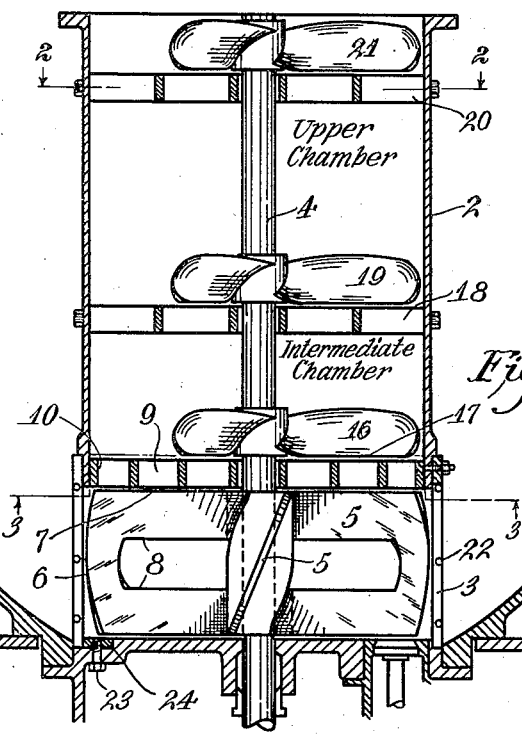
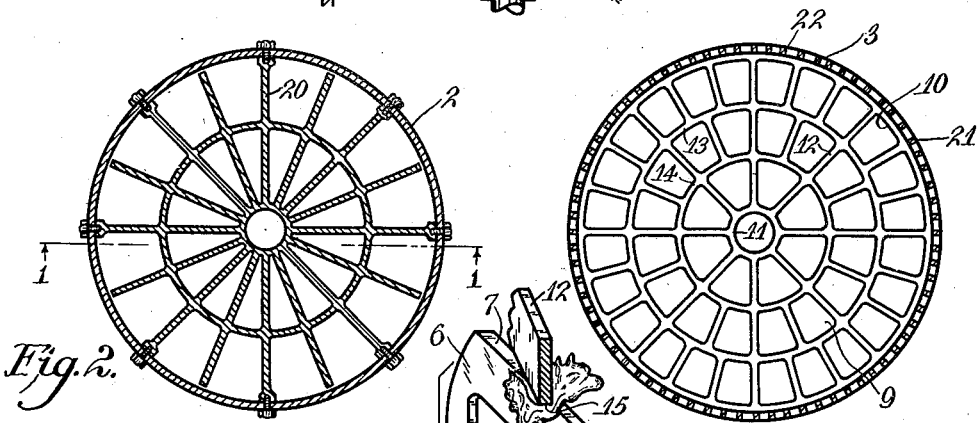
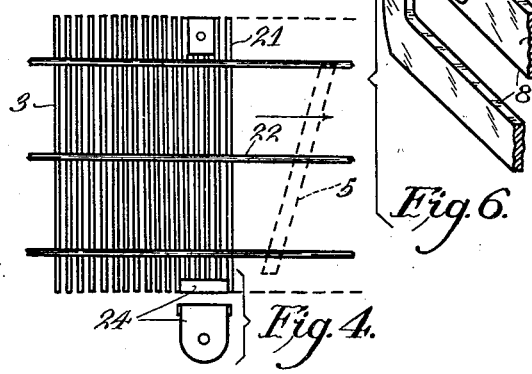
INVENTORS
RICHARD THURM
EUGENE SCHMIERER
BY George B. Willcox
ATTORNEY Patented Feb. 24, 1931

1,794,214

UNITED STATES PATENT OFFICE

RICHARD THURM AND EUGENE SCHMIERER, OF SAGINAW, MICHIGAN, ASSIGNORS TO BAKER PERKINS COMPANY, INC., OF SAGINAW, MICHIGAN, A CORPORATION OF NEW YORK

MACHINE FOR DISSOLVING XANTHATES

Application filed January 20, 1930. Serial No. 421,943.

This invention relates to improvements in machines for dissolving xanthate and similar dough-like gummy and somewhat porous masses. An improved construction, arrangement and mode of operation of the central vertical drum and its cutting and circulating mechanism, whereby the time required for mixing and dissolving each batch of material is notably reduced and the hourly output is increased, constitutes the subject matter of the present improvement.

The object of the invention is to secure maximum dissolving effect during each single circuit of the material through the drum, as distinguished from the action of prior devices that depend for their output capacity upon traversing the circuit through the machine many times, consequently requiring more prolonged treatment.

The improvement also includes a novel arrangement of grids and propellers for shearing and screening the material smaller and smaller as it passes downwardly through the drum.

The stated objects are attained by a novel arrangement of cutting grids within the central drum. They are spaced apart axially of the drum, and neighboring grids define between them a plurality of chambers or zones that progressively decrease in size toward the bottom. The material under treatment is agitated in each chamber in succession during its downward travel and immediately after each cutting.

In each downward passage through the drum the material is cut by each cutting unit (propeller and grid), in turn. Each cut is finer than the preceding one.

During the time the material is in each of the chambers it is swirled and stirred and is subjected to a great amount of laving and dissolving action upon its freshly cut surfaces. The material passes through the next group of cutting elements, consisting also of a grid and a revolving propeller knife, where like action is repeated, followed by agitation in the next chamber.

With the foregoing and certain other objects in view, which will appear later in the specification, our invention comprises the devices described and claimed and the equivalents thereof.

In the drawings Fig. 1 is a fragmentary part sectional view of the lower part of a mixing bowl with our improvement applied thereto.

Fig. 2 is a sectional view of the upper stationary cutting grid, the section taken on line 2—2 of Fig. 1.

Fig. 3 is a plan view of the lower cutting grid, taken on line 3—3 of Fig. 1, the cage or cylindrical grille being shown in place.

Fig. 4 is a fragmentary view of the cage, the relative position of the bottom impeller blade being indicated by dotted lines.

Fig. 5 is a top plan view, partly broken away, showing the bottom paddle wheel.

Fig. 6 is a fragmentary detail in perspective showing the shearing relation of the sharpened top edge of the paddle blade to the sharp-edged bar of the coacting stationary grid.

The mixer bowl 1, preferably jacketed, has an upright open-ended drum 2 mounted therein, the lower part of the drum consisting of a screen or cylindrical grille 3. A power-driven shaft 4 extends axially through the drum. Fixed to the shaft, adjacent the bottom of the bowl and within the cylindrical grille 3 is a paddle wheel with blades 5 that lie in planes extending radially outward from the shaft 4 and are tilted slightly away from the vertical.

The paddle blade margin which is adjacent the cylindrical cage 3 is preferably sharpened to provide a cutting edge 6 that cooperates with the interiorly sharpened bars of the cage to shear the material as it passes outwardly through the cage. Likewise, the upper horizontal edge 7 of each blade 5 is sharpened.

The middle area 8 of each blade 5 is cut away to reduce the impelling effect of the paddle wheel and to increase the eddying effect within the cage 3.

Immediately above the paddle wheel is a grid 9 that extends horizontally across the drum. It consists of a peripheral rim 10, Fig. 3, which is secured to the drum 2, a hub 11 within which the shaft 4 freely revolves, and radial bars 12 connecting the rim and hub. One or more circular rings 13, 14 located between the hub 11 and the rim 10 connects the several spokes, as shown in Fig. 3, to reinforce their resistance to the crosswise stresses that are set up by the revolving blades of the propellers when they are cutting the material.

The edges 15 of the grid bars 9 that co-operate with the sharpened edges 7 of the paddle wheel blades 5 are also sharpened, and these two co-operating edges 7 and 15 shear the material in the manner indicated in Fig. 6.

The circular form of grid is advantageous for reinforcing the drum to resist strains developed by the cutting operation.

Immediately above the grid 9 and fixed to the shaft 4 is a shearing element 16 of the typical propeller form commonly employed in this class of machines.

The lower edge 17 of the propeller blade is sharpened and thus is provided a plurality of shearing edges arranged in the plane of the upper surface of the grid 9. The radial arms 12 of grid 9 are sharpened along their top edges to provide knife edges. Grid 9 therefore has knife edges at both its top and bottom faces.

Vertically above the lowermost grid and propeller blade just described and spaced from them is another similarly arranged grid 18 and co-acting propeller 19 and above that, near the top of the drum, is still a third and similar assembly 20 and 21. Thus the drum 2 is divided by the grids into an upper agitating and dissolving chamber and a similar intermediate chamber and a bottom paddle wheel chamber.

The operation of the device is as follows: The flow induced by the propellers 21, 19, 16 takes place downward through the drum 2 and through the respective grids 20, 18, 9, and at the bottom of the drum the direction of flow is changed from downward to radially outward by the apertured paddle blades 5. Thence the flow is upwardly between the bowl 1 and the drum 2 and recirculation takes place in known manner.

The new result attained by the mechanism above described is that the material during its repeated circulation is forced by the top propeller 21 through the top grid 20 and in so doing it is sheared by the co-operating cutting edges of the propeller and grid.

In the upper chamber the material is agitated and swirled, and because of the size of the cavity and the reduced velocity of the material has opportunity for its freshly cut faces to become partly dissolved. After a short period in the upper chamber the material is taken by the intermediate propeller 19, is again sheared and is projected through the intermediate grid 18 into the intermediate chamber, where its freshly cut surfaces are again subjected to dissolving and agitation while being given another short period of dwell or delayed travel. The bottom propeller then takes the material, shears it again and forces it through the bottom grid 9. The bottom grid is of finer mesh, as indicated in Fig. 3, than the upper grids 18 and 20 shown in Fig. 2.

The cylindrical grille or cage 3 at the bottom of drum 2 may be formed of heavy wire mesh, or perforated sheets, or it may be built up of flat bars 22 arranged in the form of a cylinder, as shown in Fig. 4, the flat faces of the bars being disposed radially. The bars 22 are bound together by wires 22a welded hoop-wise around their outer edges, as shown in Fig. 4.

The cage 3 serves in lieu of legs for supporting the central drum. The drum and cage can be easily lifted out together after unfastening a few bolts 23 that pass through lugs 24 of cage 3 and are exterior to the mixing bowl.

By means of the plurality of vertically spaced propelling and shearing devices above described the material is urged with gradually increasing force downwardly through progressively finer grids to the bottom of the drum, where it is caught by the apertured agitating paddle wheel blades and is driven forcefully outward at high velocity against and through the fine mesh cage 3.

A single circuit of a given unit quantity of material through a machine arranged as above described results in reduction and dissolving to an extent that could otherwise be attained only by passage around the circuit again and again.

This application is a continuation-in-part of our copending application Serial No. 151,488, filed November 29, 1926.

Having thus described our invention, what we claim and desire to secure by Letters Patent is:

1. In combination with a mixer comprising a bowl containing an upright cylindrical drum having a cylindrical cage at its lower end and a central rotatable shaft with a paddle impeller fixed to the shaft at the bottom of the bowl and within the cylindrical cage, a plurality of horizontal grids fixed in said drum one above the other and spaced apart to define between them a plurality of material-circulating and -dissolving chambers arranged in succession, and angularly arranged blades on said shaft, those edges of said blades that are contiguous to the respective grids being sharpened and disposed in co-operative cutting relation therewith.

2. A structure as defined in claim 1 wherein the successive chambers from the entrance end of the drum toward its discharge end are of progressively smaller volumetric capacities.

3. A structure as set forth in claim 1 wherein the paddle blades are formed with apertures and are disposed in planes substantially upright but slightly inclined with respect to the axis of the shaft.

In testimony whereof, we affix our signatures.

RICHARD THURM.
EUGENE SCHMIERER.